United States Patent [19]

Seki et al.

[11] 4,281,416
[45] Jul. 28, 1981

[54] LIGHT SOURCE SYSTEM IN AN OPTICAL TRANSMISSION REPEATER

[75] Inventors: Norio Seki, Tokyo; Yohtaro Yatsuzuka, Yokohama; Haruo Sakaguchi, Tokyo, all of Japan

[73] Assignee: Kokusai Denshin Denwa Co., Ltd., Tokyo, Japan

[21] Appl. No.: 72,283

[22] Filed: Sep. 4, 1979

[30] Foreign Application Priority Data

Sep. 8, 1978 [JP] Japan .................................. 53-109766

[51] Int. Cl.³ .............................................. H04N 9/00
[52] U.S. Cl. .................................... 455/601; 455/612; 455/613; 250/205
[58] Field of Search ............... 455/601, 612, 613, 609, 455/610; 250/551, 552, 204, 205; 307/311

[56] References Cited

U.S. PATENT DOCUMENTS

| 3,851,167 | 11/1974 | Levine | 455/601 |
| 4,176,401 | 11/1979 | Lomberger | 455/601 |

Primary Examiner—Marc E. Bookbinder
Assistant Examiner—Edward L. Coles
Attorney, Agent, or Firm—Frailey & Ratner

[57] ABSTRACT

An optical transmission repeater with high operational reliability comprises of a plurality of light sources for transmitting an optical energy into an optical fiber, an optical connector for introducing the optical energy from each of said light sources to an optical transmission line, and a switching circuit for selectively operating only one light source. When a light source in operation is deteriorated, the light source in operation is switched to another light source by said switch. Thus, high operational reliability of an optical repeater is obtained although each of light sources have a low operational reliability.

4 Claims, 6 Drawing Figures

LIGHT SOURCE SYSTEM IN AN OPTICAL TRANSMISSION REPEATER

BACKGROUND OF THE INVENTION

The present invention relates to an optical transmission repeater system, in particular, relates to a redundant light source system in that optical transmission repeater system, in which a plurality of repeaters are inserted in an optical transmission line for the digital signal transmission.

The reliability requested for an optical repeater utilized on land is not high, since the maintenance and repair of that repeater installed on land is possible, and a standby route can be easily installed. In addition to this, the reliability requested for an optical repeater on land can be satisfied by utilizing a conventional light source, like a semiconductor laser.

However, the reliability requested for repeaters installed in the sea-bottom is very high, since the maintenance and/or repair of those repeaters installed in the sea-bottom is rather difficult, and the standby route can not be installed for those submarine cable repeaters. Further, since the long distance submarine cable like the transPacific Ocean cable is installed under the deep sea-bottom. With the depth of the sea being up to 8,000 meters and the total length of such a submarine cable is over 8,000 kilometers the reliability requested for each of the repeaters is extremely high. The conventional submarine cable utilizing coaxial cable for the transmission of an electrical signal can satisfy the severe reliability requested for that system. However, in an optical transmission system which transmits an optical signal instead of an electrical signal, the reliability of a light source for generating the light is not so high as that of electrical components, and accordingly, the long distance submarine cable utilizing an optical transmission system has been impossible.

SUMMARY OF THE INVENTION

It is an object, therefore, of the present invention to overcome the disadvantages and limitations of a prior optical repeater system by providing a new and improved optical transmission repeater.

Another object of the present invention is to provide an optical transmission repeater which has the high enough reliability to meet the requirement for the long distance submarine cable.

The basic concept of the present invention is that each optical transmission repeater has a plurality of light sources, one of which is selectively energized to generate an optical energy. Thus, the redundant configuration of light sources provides the high reliability of a light source, and then the repeater itself.

The above and other objects are attained by an optical transmission repeater comprising an optical-electrical converter connected to the input optical fiber for converting the optical energy from the optical fiber to the electrical energy, an equalization amplifier for the equalization and the amplification of the output electrical signal of said optical-electrical converter, a timing circuit for extracting the timing information in the output of said equalization amplifier, a regenerative recognition circuit for the regeneration of a pulse signal to be transmitted according to the output of said timing circuit, a power amplifier for the power amplification of the output of said regenerative recognition circuit, an optical source for generating the optical energy which is conducted to an output optical fiber, a switching transistor for supplying the bias current to said optical source according to the output pulse from said power amplifier; and said optical source having a plurality of optical source elements, a plurality of switching circuits each corresponding to each optical source elements, means for connecting the optical energy from said plurality of optical source elements to a single output optical fiber, and control means for controlling said switching circuits so that only one of the switching circuits is in ON state.

BRIEF DESCRIPTION OF THE DRAWINGS

The foregoing and other objects, features, and attendant advantages of the present invention will be understood as the same become better understood by means of the following description and accompanying drawings wherein.

DESCRIPTION OF THE PREFERRED EMBODIMENTS

Figure 1A:
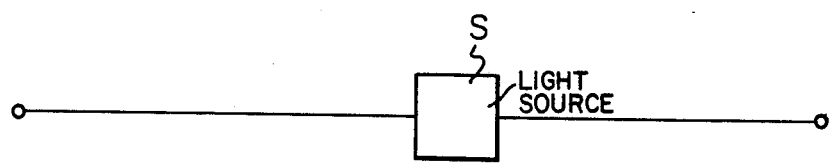
FIG. 1(A) shows the model of the system with no redundancy.
Figure 1B:
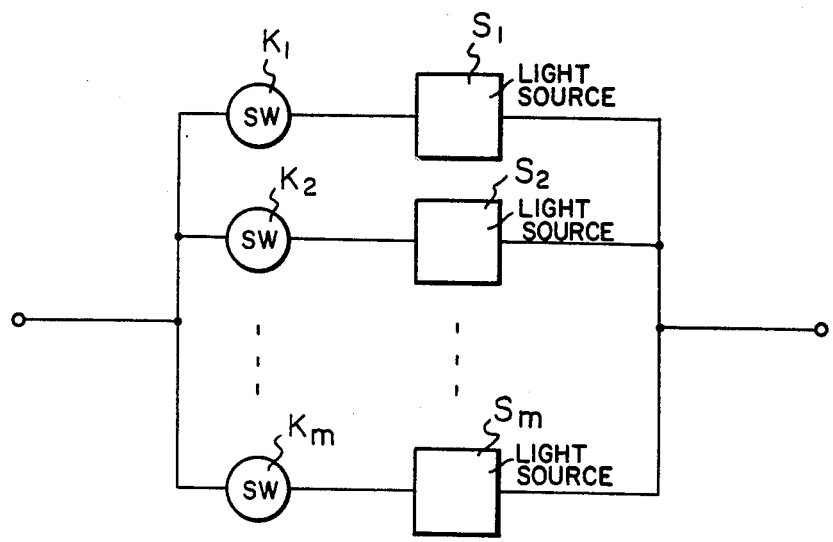
FIG. 1(B) shows the model of the system with some redundancy.

The mathematical principle of the present invention is first described in accordance with FIG. 1(A) and FIG. 1(B). FIG. 1(A) shows the system with only a single light source, and FIG. 1(B) shows the system with m number of light sources ($S_1$ through $S_m$, m is an integer larger than 2). In FIG. 1(B), the light sources $S_1$ through $S_m$ are switched by the switches $K_1$ through $K_m$, and only a single light source operates at a time. Supposing that the mean-time-between-failures (MTBF) of a switch and a light source is $1/\lambda_k$ and $1/\lambda_s$ respectively, the value of MTBF of the total system in FIG. 1(B) is shown below.

$$MTBF = (m/[\lambda_k + \lambda_s])$$

Since the reliability of a switch is considerably higher than that of a light source, and $\lambda_k << \lambda_s$ is satisfied, said formula is approximately equal to;

$$MTBF = m/\lambda_s$$

Accordingly, the MTBF of the system in FIG. 1(B) is (m) times as high as that ($MTBF = 1/\lambda_s$) in FIG. 1(A).

In FIG. 1(B), the switch $K_1$ is in ON at first, and light source $S_1$ operates. The operation of the light source $S_1$ is monitored, and the bias current of that light source $S_1$ is controlled so that the optical output level of that light source $S_1$ is constant, through the APC (Automatic Power Control). As the light source $S_1$ deteriorates, the bias current increases, and when said bias current reaches the predetermined threshold value, the threshold circuit in the repeater operates, and the fault location signal indicating the repeater is in the fault is transmitted from the repeater to the optical transmission line. Said fault location signal is inherent to each repeaters and is composed by the signal generator installed in the repeater. Said fault location signal is transmitted to the monitoring terminal at the extreme end of the optical transmission line through each of the repeaters. Said fault location signal is generated by a pseudo noise (PN) generator having (n) bits of shift register in each repeater. Said fault location signal can differentiate $(2^n-1)$ items by allocating the specific initial value to the shift register in each repeater. On the other hand, the monitoring terminal has the apparatus which generates the same fault location signal as that from each of the repeaters, and by comparing the fault location signal transmitted from the repeater with the output signal of said apparatus in the monitoring terminal, the monitoring terminal can recognize which repeater is in fault. Then, the monitoring terminal transmits the light source switching signal (later described) to the repeater in the fault through the optical transmission line in order to switch the first switch $K_1$ OFF and the second switch $K_2$ ON. Then, the second light source $S_2$ in the repeater operates. In the similar manner, when the light source is deteriorated, that light source is changed to a fresh one, one after another, and the total reliability of the repeater is increased.

Further, it should be noted that a repeater itself can switch a light source directly without transmitting the fault location signal to the monitoring terminal.

Figure 2:
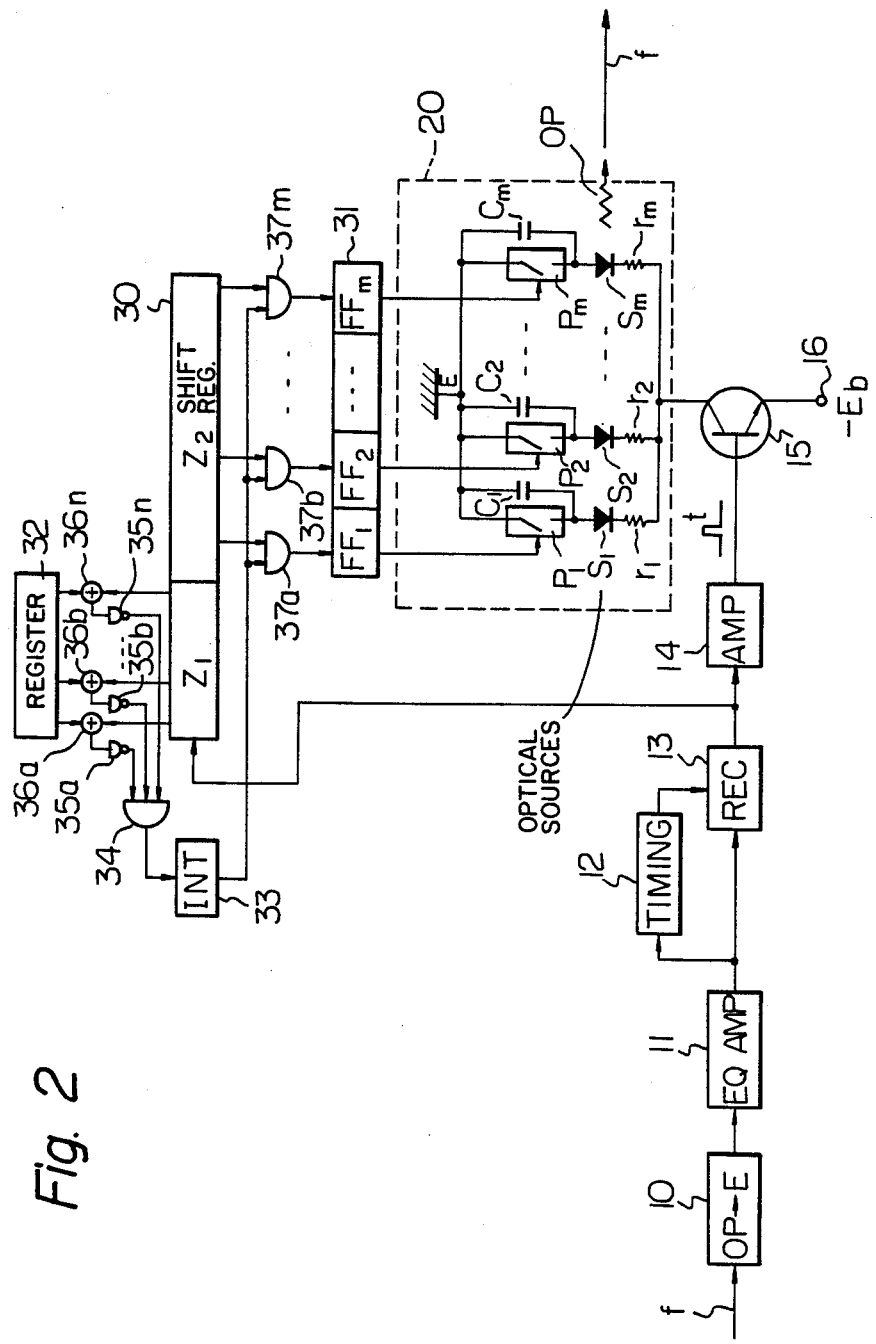
FIG. 2 shows the block diagram of the optical transmission repeater according to the present invention.

FIG. 2 shows the block diagram of the optical transmission repeater according to the present invention. In the figure, the reference numeral 110 is an optical-electrical converter which converts the optical energy from the input optical fiber (f) to the electrical energy, 11 is an equalization amplifier for the amplification of the converted electrical energy, 12 is a timing circuit which extracts the timing information from the received signal in the output of said equalization amplifier 11. The reference numeral 13 is a regenerative recognition circuit for the regeneration of the pulse signal to be transmitted. The timing information from the timing circuit 12 is utilized for the regeneration in the circuit 13. 14 is the power amplifier for driving an optical source 20. The output of the power amplifier 14 is applied to the switching transistor 15, the emitter of which is connected to the direct current power source 16 ($E_b$) and the collector of said transistor 15, is connected to the optical source 20. The transistor 15 supplied the bias voltage to the optical source 20 from the power supply 16 according to the output pulse (t) applied to the base of said transistor 15 from the output of the power amplifier 14. The optical source 20 generates the optical energy corresponding to the output signal of said power amplifier 14, and the generated optical energy (OP) is conducted to the output optical fiber (f). Thus, the input optical energy is substantially amplified through the conversion from the optical energy to the electrical energy, the amplification of said electrical energy, and the second conversion from the amplified electrical energy to the optical energy.

The optical source 20 comprises of a plurality of optical source elements $S_1$ through $S_m$. Those optical source elements are implemented by an LED (light emitting diode) or a laser diode. Each optical source element is connected between the power source 16 and the ground (E) through said transistor 15, a resistor ($r_1$ through $r_m$), and the switching circuit ($P_1$ through $P_m$). The switching circuit $P_1$ through $P_m$ can be simply implemented by a switching transistor, to which a capacitor $C_1$ through $C_m$ is connected parallel. The operation of each switching circuit $P_1$ through $P_m$ is controlled by the output of the holding circuit 31, which has a plurality of flip-flops ($FF_1$ through $FF_m$) corresponding to each switching circuit.

When the first flip-flop $FF_1$ is in the ON state, and the other flip-flops $FF_2$ through $FF_m$ are in the OFF state, only the first switch $P_1$ is controlled to be ON, and the other switches $P_2$ through $P_m$ are in the OFF state. Accordingly, the first optical power source element $S_1$ is energized when the input pulse (t) is applied to the transistor 15, and said power source element $S_1$ generates the optical energy according to the input pulse signal (t), and the generated optical energy is conducted to the optical fiber (f). When there is something wrong with the first optical source element $S_1$, the holding circuit 31 is controlled so that the first flip-flop $FF_1$ goes into the OFF state, and the second flip-flop $FF_2$ goes into the ON state, then the second switch $P_2$ goes ON, and the second optical source element $S_2$ generates the optical energy. It should be noted that the optical source element can be switched in a similar manner until the last optical source element $S_m$. Accordingly, the present optical transmission repeater can function as long as at least one optical source element is available, and thus, the reliability of the repeater itself is considerably increased. It should be noted that a switching circuit $P_1$ through $P_m$ can also be implemented by an electro-magnetic relay.

Next, the switching of the optical source elements, that is to say, the control of the holding circuit 31 will be explained.

Figure 3:
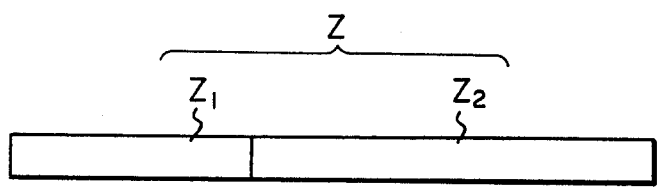
FIG. 3 shows the format of the switching instruction signal generated in the monitoring terminal station and is transmitted to all the repeaters.

In the present embodiment, the switching of the optical source element is instructed by one of the terminal stations on land. Said terminal station monitors the operation of each repeater, and when there is something wrong with the particular repeater, the switching signal is transmitted from said terminal station to the repeaters. FIG. 3 shows the format of the switching instruction signal Z, which has the first position $Z_1$ for designating one of the repeaters, and the second position $Z_2$ for designating one of the optical source elements in the particular repeater designated by the position $Z_1$. The switching instruction signal Z is transmitted from said monitoring terminal station to the repeaters through the optical fiber(f), and each repeater repeats the switching instruction signal in the same manner as an ordinary signal to be repeated. At the same time, each repeater branches said switching instruction signal at the output of the regenerative recognition circuit 13, and the branched switching instruction signal is applied to the input of the shift register 30.

When all bits of the switching instruction signal Z are stored in the shift register 30, the first position $Z_1$ is compared with the content of the register 32, which stores the particular bits of pattern designated to each repeater. Said comparison is performed bit by bit in a plurality of exclusive-OR circuits 36a through 36n. The output of those exclusive-OR circuits (comparator) is applied to the AND circuit 34 through the respective inverters 35a through 35n. When all bits in the position $Z_1$ coincide with the content of the register 32, the AND circuit 34 provides the output signal.

That presence of the output signal of the AND circuit 34 means that the present repeater is designated to switch an optical source element according to the content of the bit position $Z_2$. Then, the output of said AND circuit 34 is applied to the AND circuits 37a through 37m through the integrator 33. The integrator 33 is provided so that the switching of an optical source element is performed only when the AND circuit 34 provides the plurality of consecutive output signals in order to avoid the wrong operation of the switching. So the time constant of said integrator 33 is determined in accordance with the preferable consecutive number of switching instruction signals.

When the integrator 33 provides the output signal, the AND circuits 37a through 37m open, and the content of the second position $Z_2$ of the shift register 30 is transferred to the holding circuit 31. It should be noted that it is supposed that only one bit of the second position $Z_2$ is in the ON state, and only one flip-flop in the holding circuit 31 goes into the ON state to energize the designated optical source element.

Another embodiment for switching an optical source element is of course possible. In that case, the failure of an optical source element is detected in a repeater itself by monitoring the amount of the bias current flowing the optical source element, and when the failure of the optical source element is detected, the content of the shift register is shifted by one bit.

Figure 4:
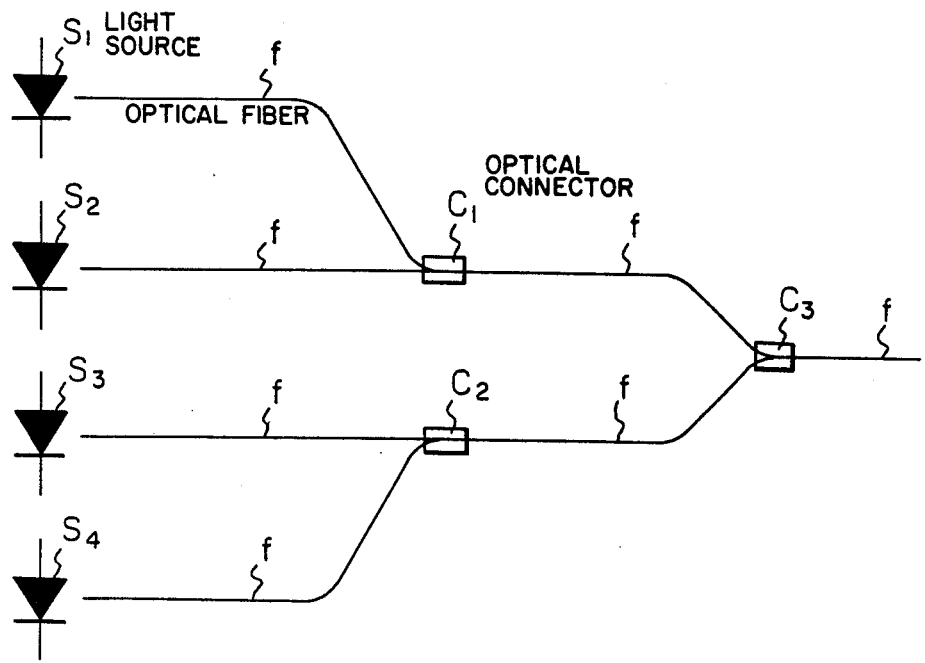
FIG. 4 shows the structure of the optical connector.

FIG. 4 shows the embodiment of the connection between a plurality of light sources and an optical fiber. In the figure, the symbols $S_1$ through $S_4$ show light source elements f shows an optical fiber, $C_1$ through $C_3$ show an optical connector. An optical connector can be implemented by utilizing a conventional focusing rod lens, or a conventional structure in that a pair of optical fibers are directly coupled.

Figure 5:
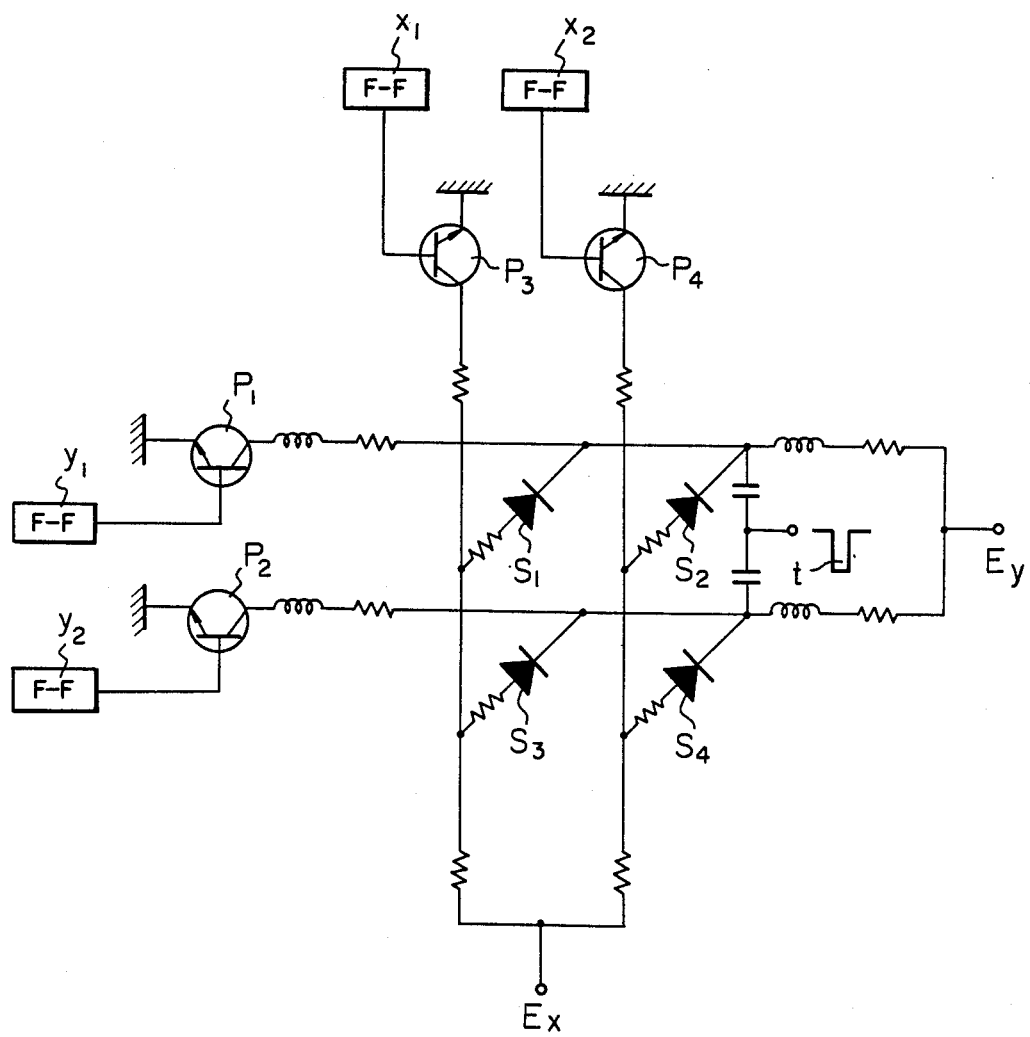
FIG. 5 is the modification of the optical source according to the present invention.

FIG. 5 shows the other embodiment of the present invention, and a plurality of light source elements $S_1$ through $S_4$ are arranged in a matrix circuit. In the figure, the symbols $x_1$, $x_2$, $Y_1$ and $Y_2$ are a flip-flop, $P_1$ through $P_4$ are a transistor. When $x_1=0$, $X_2=1$, $Y_1=1$ and $Y_2=0$, the light source element $S_1$ is energized and the forward bias current and that light source element $S_1$ operates to emit a light beam, while another light source elements $S_2$, $S_3$, $S_4$ do not operate as the power sources $E_x$ and $E_y$ are so determined, that said light sources $S_2$, $S_3$ and $S_4$ are cut off when the input signal (t) is ON state. Similarly, the light source element $S_2$ operates on the condition that $x_1=1$, $x_2=0$, $Y_1=1$ and $Y_2=0$, the light source element $S_3$ operates when $x_1=0$, $x_2=1$, $Y_1=0$ and $Y_2=1$, and the light source element $S_4$ operates when $x_1=1$, $x_2=0$, and $Y_2=1$.

As described in detail, according to the present invention, an optical repeater with high operational reliability is realized utilizing a plurality of light source elements which are switched in sequence, although the reliability of each light source element is not high. Thus, the present optical repeater is beneficial for an optical communication system.

From the foregoing it should now be apparent that a new and improved light source system in an optical transmission repeater has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An optical transmission repeater comprising of an optical-electrical converter connected to the input optical fiber for converting the optical energy from the optical fiber to the electrical energy, an equalization circuit for the equalization of the output electrical signal of said optical-electrical converter, a timing circuit for extracting the timing information in the output of said equalization amplifier, a regenerative recognition circuit for the regeneration of a pulse signal to be transmitted according to the output of said timing circuit, a power amplifier for the power amplification of the output of said regenerative recognition circuit, a optical source for generating the optical energy which is conducted to an output optical fiber, and a switching transistor for supplying the bias current to said optical source according to the output pulse from said power amplifier, characterized in that said optical source has a plurality of optical source elements, a plurality of switching circuits each corresponding to each optical source elements, means for connecting the optical energy from said plurality of optical source elements to a single output optical fiber, and control means for controlling said switching circuits so that only one of the switching circuits is in the ON state.

2. An optical transmission repeater according to claim 1, wherein said control means comprises a shift register having the first position ($Z_1$) and the second position ($Z_2$), the input of said shift register being supplied from the output of said regenerative recognition circuit, another register storing the information designated to the present repeater, comparison means for comparing the contents of said another register with the first position of said shift register bit by bit, an AND circuit for providing the output signal when said comparison means in all the bits provide the output signal, an integrator connected to the output of said AND circuit for providing the output signal only when said AND circuit provides the plurality of consecutive output signals, a plurality of another AND circuits one input of each of which is connected to the output of said integrator and the other input of each of which is connected to the output of the related bit of the second position of said shift register, and a holding circuit having a plurality of flip-flops each connected to the output of the related AND circuit, and the output of said holding circuit controlling said switching circuit.

3. An optical transmission repeater according to claim 2, wherein said optical source element is a PIN diode.

4. An optical transmission repeater according to claim 2, wherein said optical source element iis a laser diode.

* * * * *